(12) United States Patent
Kashyap et al.

(10) Patent No.: US 10,346,178 B2
(45) Date of Patent: Jul. 9, 2019

(54) SECURE NETWORK SERVER BOOT WITHOUT THE USE OF DHCP AND PXE

(71) Applicant: Lenovo Enterprise Solutions (Singapore) Pte. Ltd., Singapore (SG)

(72) Inventors: Vivek Kashyap, Portland, OR (US); Gregory B. Pruett, Raleigh, NC (US)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 637 days.

(21) Appl. No.: 14/831,811

(22) Filed: Aug. 20, 2015

(65) Prior Publication Data

US 2017/0052795 A1    Feb. 23, 2017

(51) Int. Cl.
| | | |
|---|---|---|
| *G06F 15/16* | (2006.01) | |
| *G06F 9/4401* | (2018.01) | |
| *H04L 12/58* | (2006.01) | |
| *H04L 29/12* | (2006.01) | |

(52) U.S. Cl.
CPC .......... *G06F 9/4416* (2013.01); *H04L 51/063* (2013.01); *H04L 61/2015* (2013.01)

(58) Field of Classification Search
CPC .... H04L 661/2015; H04L 51/063; G06F 9/00
USPC ................................................. 709/222, 220
See application file for complete search history.

(56) References Cited

U.S. PATENT DOCUMENTS

| | | | | |
|---|---|---|---|---|
| 6,560,706 B1* | 5/2003 | Carbajal | ............... | G06F 9/4416 713/155 |
| 9,300,728 B1* | 3/2016 | Ananchaperumal | .... | H04L 67/10 |
| 9,928,082 B1* | 3/2018 | Huynh Van | ........... | G06F 9/4416 |
| 2004/0162977 A1* | 8/2004 | King | ..................... | G06F 9/4405 713/2 |
| 2005/0122977 A1* | 6/2005 | Lieberman | .............. | H04L 67/06 370/394 |
| 2005/0283573 A1* | 12/2005 | Mewhinney | .......... | G06F 12/122 711/136 |
| 2005/0283575 A1* | 12/2005 | Kobayashi | ............ | G06F 3/0604 711/147 |

(Continued)

OTHER PUBLICATIONS

Hofemeier, G. "Speeding up Intel(R) AMT IDE-Redireaction with a 2-stage book process," Intel Developer Zone Page, retrieved from https://software.intel.com/en-us/blogs/2014/01/21/speeding-up-intelr-amt-ide-redirection-with-a-2-stage-boot-process, Jan. 21, 2014, 1 page.

*Primary Examiner* — Thanh T Nguyen
(74) *Attorney, Agent, or Firm* — Zilka-Kotab, P.C.

(57) ABSTRACT

In one embodiment, a method includes detecting that a processor is attempting to boot a server using a network boot option over a first network. The method also includes receiving a network address, using the processor, from an integrated management module (IMM) connected to the processor via a local connection without using a dynamic host configuration protocol (DHCP) server on the first network. In another embodiment, a computer program product includes a computer readable program medium. The computer readable program medium includes program instructions configured to cause a processor in an IMM to intercept a network boot option initiated by a server over a first network and acquire a network address for the server without using a DHCP in the first network. The IMM is connected to the server via a local connection. Other methods, systems, and computer program products are described according to more embodiments.

17 Claims, 5 Drawing Sheets

(56) References Cited

U.S. PATENT DOCUMENTS

| | | | | |
|---|---|---|---|---|
| 2007/0268515 A1* | 11/2007 | Freund | .................... | H04L 67/34 |
| | | | | 358/1.15 |
| 2007/0268516 A1* | 11/2007 | Bugwadia | ............... | H04L 67/34 |
| | | | | 358/1.15 |
| 2010/0325425 A1* | 12/2010 | Park | ...................... | H04W 12/04 |
| | | | | 713/155 |
| 2015/0089022 A1* | 3/2015 | Husain | ................ | H04L 67/1095 |
| | | | | 709/219 |

* cited by examiner

SECURE NETWORK SERVER BOOT WITHOUT THE USE OF DHCP AND PXE

BACKGROUND

The present invention relates to server boot up in a network setting, and more particularly, the present invention is directed to booting up multiple servers in a datacenter network.

A typical datacenter may include many servers, numbering in the tens of thousands. Some of the largest datacenters may include hundreds of thousands of servers. Typically, each required server must be booted up in order for the datacenter to function properly. When there is a need to boot up the servers in a datacenter, there are several current methods that may be used. One method is to manually assign static IP addresses to all of the servers in the datacenter, which is a very time consuming process, particularly when more than a handful of servers are present in the datacenter. Another method is to rely on dynamic host configuration protocol (DHCP) to distribute network parameters, such as internet protocol (IP) addresses, for interfaces and services for each of the servers in the datacenter. This method is much faster than manual assignment, but requires the use of DHCP. In another approach, when the servers are enabled to use the preboot execution environment (PXE), PXE may be used to boot a software assembly, retrieved from the network, in each of the servers, after the IP address is assigned using DHCP. However, many administrators actively disable the use of DHCP and PXE in datacenters due to security concerns regarding the use of these protocols.

SUMMARY

In one embodiment, a method includes detecting that a processor is attempting to boot a server using a network boot option over a first network. The method also includes receiving a network address, using the processor, from an integrated management module (IMM) connected to the processor via a local connection without using a dynamic host configuration protocol (DHCP) server on the first network.

In another embodiment, a computer program product includes a computer readable program medium. The computer readable program medium includes program instructions configured to cause a processor in an IMM to intercept a network boot option initiated by a server over a first network. The computer readable program medium also includes program instructions configured to cause the processor in the IMM to acquire a network address for the server without using a DHCP in the first network. The IMM is connected to the server via a local connection.

According to yet another embodiment, a system includes a host processor configured to boot the system using a network boot option over a first network and an IMM connected to the host processor via a local connection. The IMM includes logic configured to acquire a network address for the system in response to a determination that the host processor initiated the network boot option over the first network.

DETAILED DESCRIPTION

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. Furthermore, "about" when preceding a value (X) refers to the value plus or minus 10% of X unless otherwise specified, e.g., about X indicates X±0.1*X.

In one general embodiment, a method includes detecting that a processor is attempting to boot a server using a network boot option over a first network. The method also includes receiving a network address, using the processor, from an integrated management module (IMM) connected to the processor via a local connection without using a dynamic host configuration protocol (DHCP) server on the first network.

In another general embodiment, a computer program product includes a computer readable program medium. The computer readable program medium includes program instructions configured to cause a processor in an IMM to intercept a network boot option initiated by a server over a first network. The computer readable program medium also includes program instructions configured to cause the processor in the IMM to acquire a network address for the server without using a DHCP in the first network. The IMM is connected to the server via a local connection.

According to yet another general embodiment, a system includes a host processor configured to boot the system using a network boot option over a first network and an IMM connected to the host processor via a local connection. The IMM includes logic configured to acquire a network address for the system in response to a determination that the host processor initiated the network boot option over the first network.

In particular, various embodiments of the invention discussed herein are implemented using the Internet to communicate among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and may be omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

Figure 1:
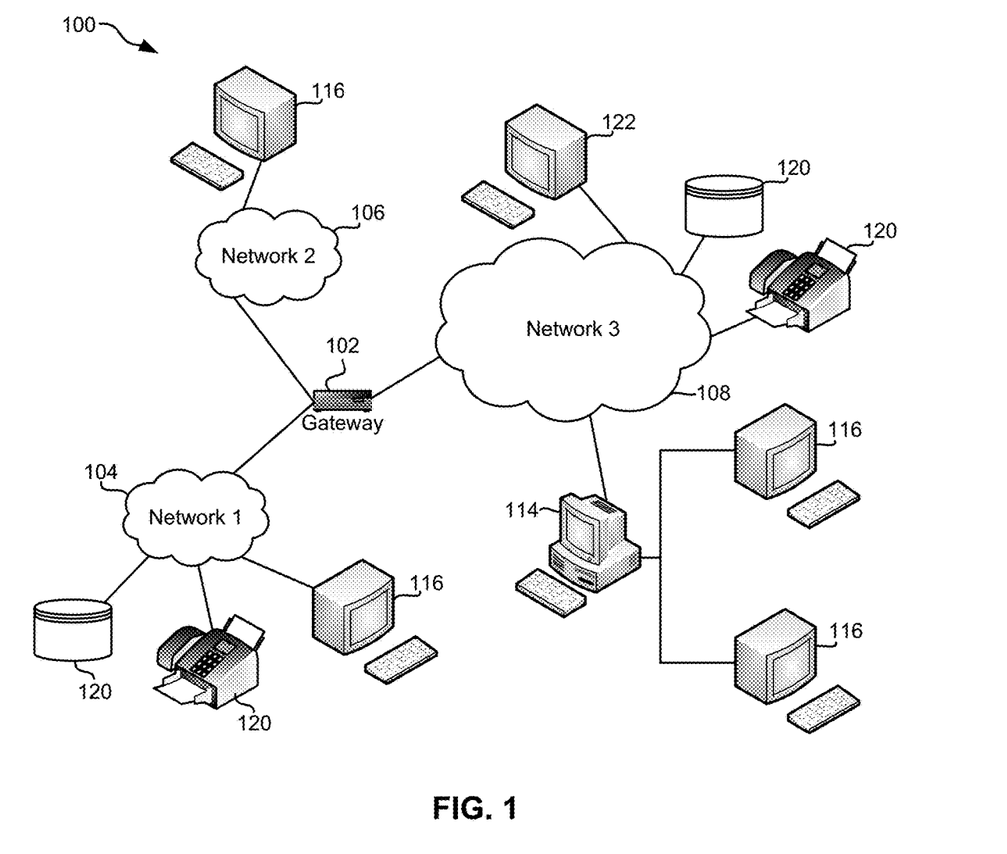
FIG. 1 illustrates a network architecture, in accordance with one embodiment.

FIG. 1 illustrates a network architecture 100, in accordance with one embodiment. As an option, the network architecture 100 may be implemented in conjunction with features from any other embodiment listed herein, such as those described with reference to the other figures. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks are provided, including a first remote network 104 and a second remote network 106. A gateway 102 may be coupled between the remote networks and a proximate third network 108. In the context of the present network architecture 100, the networks 104, 106, 108 may each take any form including, but not limited to, a LAN, a WAN such as the Internet, public switched telephone network (PSTN), wireless LAN, wireless WAN, storage area network (SAN), virtual private network (VPN), internal telephone network, etc.

In use, the gateway 102 serves as an entrance point from the remote networks 104, 106 to the proximate network 108. As such, the gateway 102 may function as a router, which is capable of directing a given packet of data that arrives at the gateway 102, and a switch, which furnishes the actual path in and out of the gateway 102 for a given packet.

Further included is at least one data server 114 coupled to the proximate network 108, and which is accessible from the remote networks 104, 106 via the gateway 102. It should be noted that the data server(s) 114 may include any type of computing device/groupware known in the art. Coupled to each data server 114 is a plurality of user devices 116. Such user devices 116 may include a desktop computer, laptop computer, hand-held computer, smart phone, printer, scanner, copier, or any other type of device, machine, or logic. It should be noted that a user device 122 may also be directly coupled to any of the networks, in one embodiment. Any user device known in the art may be directly connected, such as a workstation, a laptop computer, a handheld computer, a smart phone, a console, etc.

A peripheral 120 or series of peripherals 120, e.g., facsimile machines, printers, networked storage units, memory devices, user input devices, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC operating system environment, a LINUX system which emulates a UNIX system, a UNIX system which virtually hosts a MICROSOFT WINDOWS environment, a MICROSOFT WINDOWS system which emulates a MAC operating system environment, etc. This virtualization and/or emulation may be enhanced through the use of a virtualization platform in some embodiments, such as VMWARE software, TRANGO, XEN, IBM ZNM, etc.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
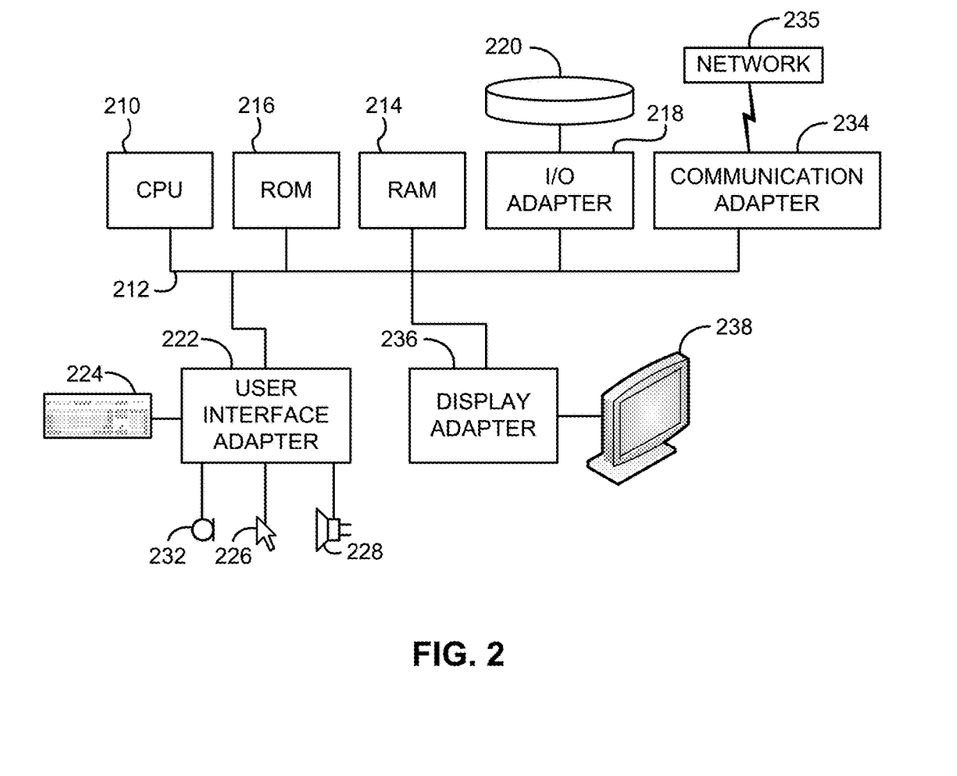
FIG. 2 shows a representative hardware environment that may be associated with the network of FIG. 1, in accordance with one embodiment.

FIG. 2 shows a representative hardware environment associated with the network 100, such as a user device 116, server 114, etc., of FIG. 1, in accordance with one embodiment. This figure illustrates a typical hardware configuration of a workstation having a central processing unit (CPU) 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network), and a display adapter 236 for connecting the bus 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, C+, and/or C++ language, or other programming languages, along with an object oriented programming methodology. In another embodiment, object oriented programming (OOP), which has become increasingly used to develop complex applications, may be used.

Figure 3:
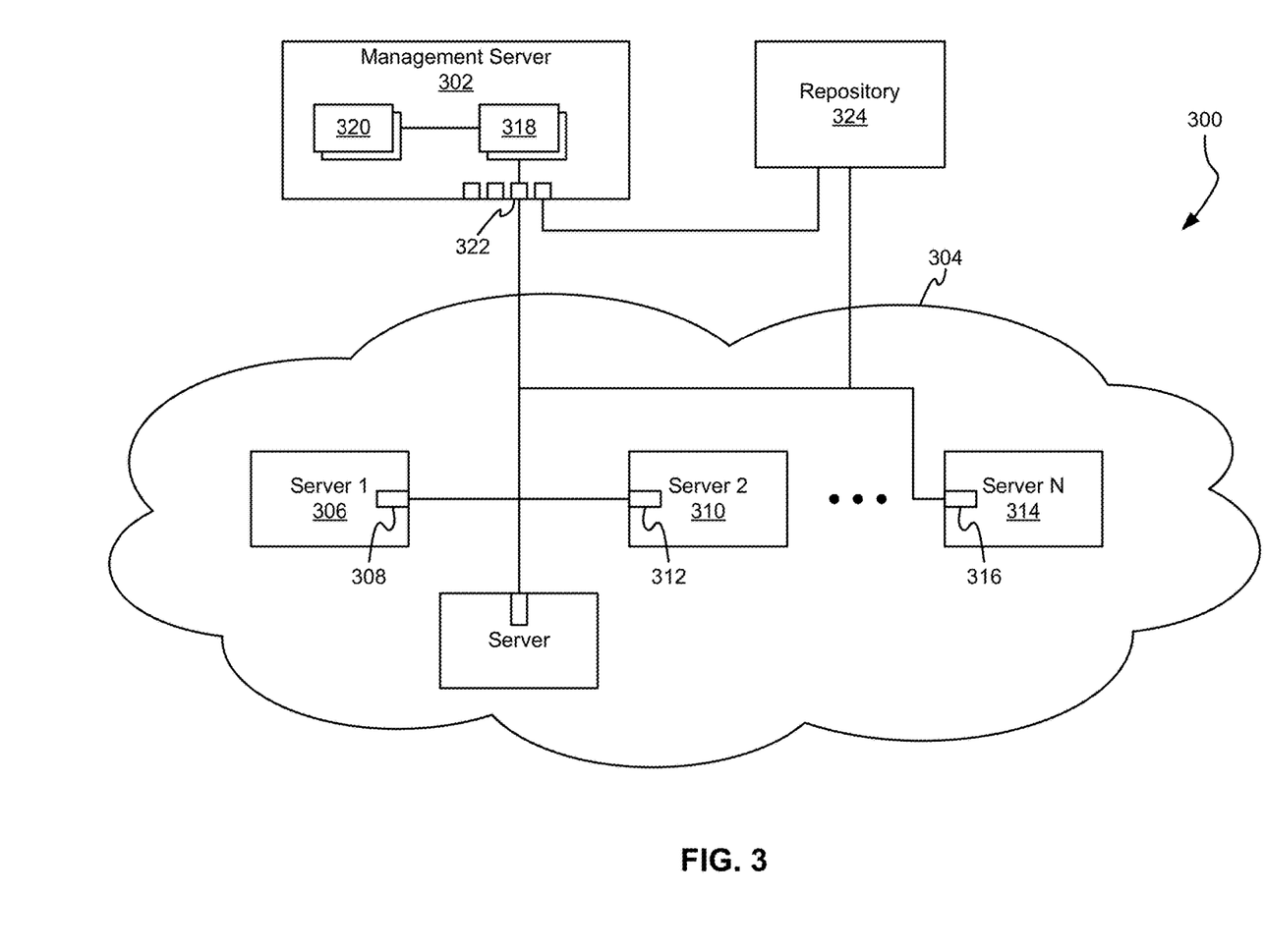
FIG. 3 shows a network system according to one embodiment.

Now referring to FIG. 3, a network system 300 is shown according to one embodiment. The network system 300 includes a management server 302 connected to one or more physical or virtual servers in a network 304. The management server 302 comprises one or more processors 318, e.g., CPU, application specific integrated circuit (ASIC), FPGA, microprocessor, etc., at least one memory 320 (e.g., RAM, ROM, non-volatile memory (NVM) like Flash memory, etc.), and at least one port 322 for interconnecting with the servers in the network 304. The port(s) may be controlled by one of the processors 318 in order to communicate with the servers. The port(s) may be any type of port known in the art, such as an Ethernet port, a peripheral component interconnect express (PCIe) port, serial port, IEEE 1394 interface port, small computer serial interface (SCSI) port, etc. The management server 302 may communicate to the various servers in the network 304 via a dedicated or a shared communication channel over any communication protocol known in the art, such as Ethernet, PCIe, transmission control protocol (TCP), dynamic data exchange (DDE), Internet control message protocol (ICMP), etc.

Any number of servers may be connected to the management server 302, such as 1 server, 10 servers, 100 servers, 1000 servers, etc., depending on the computing and/or processing power of the management server 302 to handle all connected physical and/or virtual servers in the network 304. This is indicated in FIG. 3 by the ellipses between server 2 310 and server N 314. As shown in FIG. 3, four servers are connected to the management server 302 including server 1 306, server 2 310, and server N 314.

Any suitable connection and communication protocol may be used to connect the management server 302 to the various servers, such as Ethernet, LAN, VLAN, etc. Furthermore, in one embodiment, the various servers may be connected to the management server 302 via a dedicated communication channel within each server in a private management network, such as an integrated management module (IMM), such as IMM 308 on server 1 306, IMM 312 on server 2 310, . . . , IMM 316 on server N 314. One or more of the servers, in one embodiment, may be embodied as a physical hardware server with at least one processor (such as a CPU, ASIC, FPGA, etc.) and at least one memory (such as RAM, ROM, NVM, etc.). In an alternate embodiment, one or more of the servers may be embodied as a virtual server operating on another physical hardware device, such as a physical server, mainframe, etc., and may comprise one or more virtual ports.

The network 304 may include more devices (physical and/or virtual) such as switches, routers, gateways, etc., as would be understood by one of skill in the art. Furthermore, one or more devices may be positioned in the network 304 between the management server 302 and the various servers in the network 304.

In one embodiment, the management server 302 and/or the various servers in the network 304 may be connected to a repository 324 that is configured to store boot images, and may possibly include various applications and/or components to install on the various servers during boot up, in more embodiments.

Figure 4:
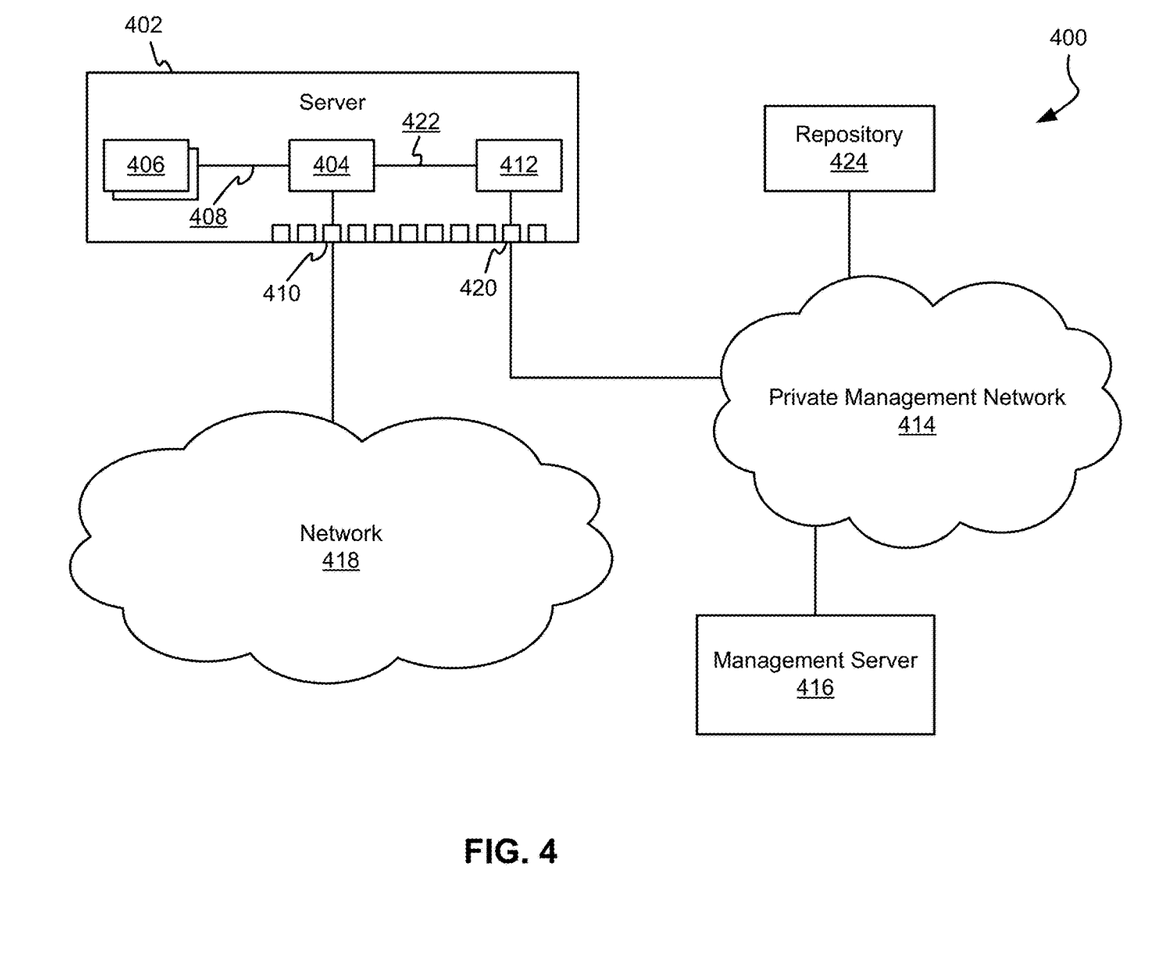
FIG. 4 shows a system according to one embodiment.

Now referring to FIG. 4, a system 400 is shown according to one embodiment. The system 400 includes a server 402. The server 402 includes a host processor 404, one or more memories 406 connected to the host processor 404 via one or more connections 408, one or more ports 410 configured to connect to other devices within a network 418 such as routers, switches, gateways, etc., and an IMM 412 connected to the host processor 404 via a universal serial bus (USB) connection 422. The IMM 412 may comprise a service processor of a type known in the art, such as a CPU, an ASIC, a FPGA, a microprocessor, an integrated circuit, etc., and may be configured to perform logical operations based on logic integrated with and/or executable by the service processor of the IMM 412.

The memory 406 may be any type of computer readable storage known in the art that is suitable for use in a networking device, such as RAM, ROM, NVM, etc.

The network 418 may be any type of network known in the art, such as a WAN, a LAN, a SAN, etc. In one embodiment, the IMM 412 may also be connected to at least one port 420 configured to connect via a private management network 414 to a management server 416.

This connection to the private management network 414 may be provided by one of many possible connection protocols and/or techniques, such as via a LAN, via Ethernet, via a VLAN, using a damage control protocol (DCP) stack, etc.

The host processor 404 is configured to boot the system using a network boot option over the network 418. However, in some instances, it is undesirable to utilize certain resources on the network 418 when booting up the server 402, such as a DHCP server. Furthermore, it may be desirable not to utilize preboot execution environment (PXE) to boot a software assembly in the server. In these instances, the IMM 412 may be utilized to assist in the booting of the server 402.

The private management network 414 may include any devices suitable for routing and/or switching traffic between the management server 416 and IMMs of one or more servers in the private management network 414, including the IMM 412 of the server 402. Furthermore, the private management network 414 may utilize any suitable protocol for exchanging information, such as data packets, between the various devices in the private management network 414, such as Ethernet, Fibre Channel (FC), FC over Ethernet (FCoE), PCIe, etc.

The server 402 may include logic readable and/or executable by the host processor 404, the IMM 412, or a combination thereof. In one embodiment, the logic is configured to acquire an internet protocol (IP) address for the server 402 in response to a determination that the host processor 404 initiated the network boot option in an attempt to obtain a boot image over the network 418 and obtain an IP address for the server.

In one embodiment, the IMM 412 may further comprise logic configured to provide the IP address to the host processor 404 as a static IP address selected from a predetermined range of IP addresses stored in the IMM 412 or accessible to the IMM 412 in the memory 406 of the server 402.

In another embodiment, the IMM 412 may further comprise logic configured to request a target configuration from the management server 416 connected to the server 402 via the private management network 414, receive the target configuration for the server 402, and provide the target configuration to the host processor 404. The target configuration may comprise one or more of the following information: instructions on how to obtain an IP address for the server 402, a virtual private network (VPN) configuration to reach a repository 424, a path to the repository 424, and/or a protocol to be used by the server 402. Exemplary protocol choices may include, but are not limited to, trivial file transfer protocol (TFTP), hypertext transfer protocol secure (HTTPS), file transfer protocol (FTP), etc.

The path to the repository may be provided according to one or more formats usable by the processor, such as a TFTP path, a path through the private management network (hop-by-hop), etc. Furthermore, the path to the repository may comprise an address of the repository, which may be provided according to one or more formats usable by the processor, such as an IP address, an HTTP host address and port number, etc.

In one embodiment, the repository 424 may be included in the management server 416 and/or may be accessible to the management server 416. In an alternate embodiment, the repository 424 may be accessible to the server 402 via the network 418 and/or via the private management network 414. The repository 424, in one embodiment, includes at least one boot image, and when multiple boot images are present in the repository 424, each boot image may be configured for different types of servers. In one embodiment, boot images stored to the repository 424 may be differentiated based on the operating system of the particular server, e.g., one boot image may be configured for a WINDOWS server, another boot image may be configured for a RED-HAT server, another boot image may be configured for a LINUX server, etc. In another embodiment, boot images stored to the repository 424 may be differentiated based on the function and/or purpose of the server, e.g., one boot image for a server configured to provide services to packets in the network 418, another boot image for a server configured to host virtual switches for traffic switching, etc.

In another embodiment, the host processor 404 may obtain one or more additional applications, logical components, etc., from the repository 424. These applications/components may be installed by the host processor 404 in order to configure the server 402 to perform some desired functionality.

The instructions on how to obtain an IP address for the server 402 may comprise instructions to utilize DHCP to obtain the IP address from a DHCP server (not shown), instructions to receive a static IP address from the IMM 412 or from the management server 416, instructions to utilize IPv6 auto-configuration to obtain an IP address, instructions to obtain an IP address from an administrator, such as through a console (not shown) connected to the server 402, etc.

In one embodiment, after receiving the target configuration from the management server 416, from the IMM 412, from the repository, or from some other device in the network 418 or in the private management network 414, the host processor 404 may further comprise logic configured to utilize the target configuration to initialize the server 402. Initialization includes booting the server 402.

In a further embodiment, initialization of the server 402 may include installing a boot image to provide an operating architecture for the server 402, as would be understood by one of skill in the art. In another further embodiment, initialization of the server 402 may include configuring the server's various parameters to put the server 402 in condition for operation in the network 418, as would be understood by one of skill in the art.

Figure 5:
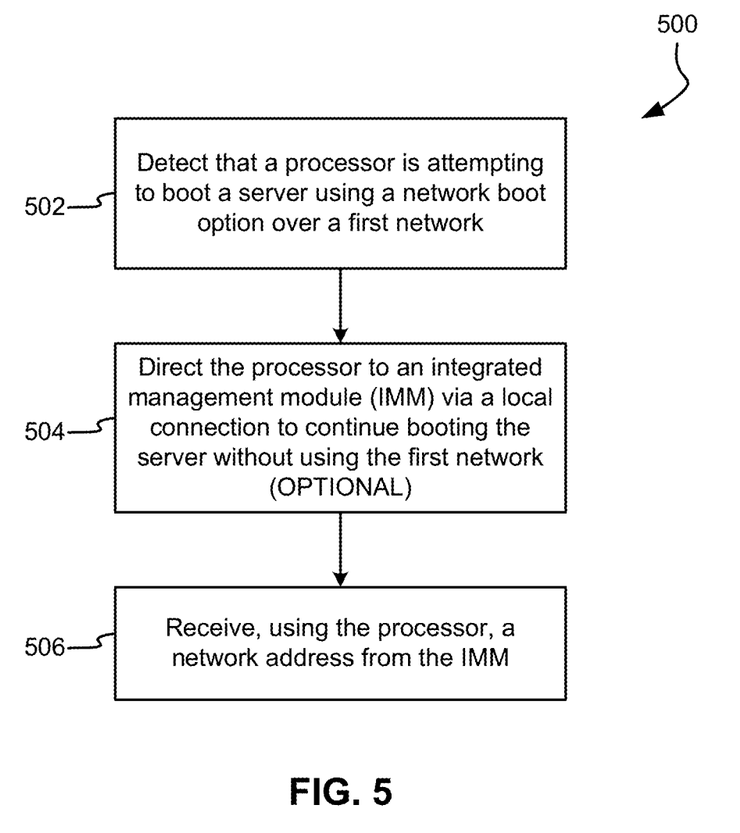
FIG. 5 shows a method according to one embodiment.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a host processor of a server, a service processor of an IMM, a management server, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a CPU, an ASIC, a FPGA, etc., combinations thereof, or any other suitable computing device known in the art.

As shown in FIG. 5, method 500 may initiate with operation 502, where it is detected that a processor, such as a host processor of a server, is attempting to boot the server using a network boot option over a first network, such as a LAN, WAN, SAN, etc. This attempt to boot the server may be detected by an IMM locally connected to the server in one embodiment.

In optional operation 504, the processor is directed to an IMM via a local connection, such as a USB connection, PCIe connection, etc., to continue booting the server without using the network. In this way, the server may be forced to be booted without access to some standard boot resources. Some exemplary boot resources include a DHCP server to obtain an IP address for the server, PXE to boot a software assembly in the server, etc.

In operation 506, a network address is received, using the processor, from the IMM connected to the processor via a local connection. The network address is received without using a DHCP server on the first network. This network address may be used by the processor to complete the boot of the server, in one embodiment.

In a further embodiment, the IMM may select a static IP address from a predetermined range of IP addresses stored in the IMM or accessible to the IMM in a memory of the server. This static IP address may then be provided to the processor in order to continue the boot of the server, to be assigned to the server.

In more embodiments, the network address may be a media access control (MAC) address, a network layer address, a host address, etc.

In another embodiment, the method 500 may further include requesting a target configuration from a management server connected to the server via a private management network (such as via the IMM, the processor, or some other component of the server), and receiving the target configuration for the server using the processor of the server.

In one embodiment, when the IMM obtains the target configuration, the IMM also provides the target configuration to the processor.

This target configuration may include one or more pieces of information useful in booting the server, such as instructions on how to obtain a network address for the server, a VPN configuration to reach a repository, a path to the repository, and/or a protocol to be used by the server. Exemplary protocol choices may include, but are not limited to, trivial file transfer protocol (TFTP), hypertext transfer protocol secure (HTTPS), file transfer protocol (FTP), etc.

The path to the repository may be provided according to one or more formats usable by the processor, such as a TFTP path, a path through the private management network (hop-by-hop), etc. Furthermore, the path to the repository may comprise an address of the repository, which may be provided according to one or more formats usable by the processor, such as an IP address, an HTTP host address and port number, etc.

In one embodiment, the repository may be included in the management server and/or may be accessible to the management server. In an alternate embodiment, the repository may be accessible to the server via the network and/or via the private management network.

The repository, in one embodiment, includes at least one boot image, and when multiple boot images are present in the repository, each boot image may be configured for different types of servers. In one embodiment, boot images stored to the repository may be differentiated based on the operating system of the particular server. In another embodiment, boot images stored to the repository may be differentiated based on the function and/or purpose of the server. Of course, any other differentiation between boot images may be present, as would be understood by one of skill in the art upon reading the present descriptions.

In another embodiment, the processor may obtain one or more additional applications, logical components, etc., from the repository. These applications and/or components may be installed by the processor in order to configure the server to perform some desired functionality.

The instructions on how to obtain an IP address for the server may comprise instructions to utilize DHCP for particular services resident and/or installed to the server from a DHCP server, instructions to receive a static IP address from the IMM or from the management server, instructions to utilize local IPv6 auto-configuration to obtain an IP address, instructions to obtain an IP address from an administrator, such as through a console connected to the server, etc.

Method 500 may further include utilizing the target configuration to initialize the server. This may be performed by the processor of the server, or by some other component of the server configured for such functionality.

According to one embodiment, the IMM may act as a DHCP agent that accesses information locally on the server and/or from a management server connected to the server via a private management network. In this way, the processor sends a DHCP request to the network as would normally occur when attempting to boot the server using a DHCP server over the first network. The processor of the server is unaware that the IMM will be utilized to obtain the network address, and continues to perform the network boot option, while communicating with the IMM instead of a DHCP server on the network.

In this way, the processor sends a DHCP request to the IMM and receives the network address in a response to the DHCP request from the IMM.

In one approach, the network boot option utilizes DHCP, and when the network boot option is redirected to the IMM via the local connection, the IMM acts as a local DHCP server or a DHCP agent without utilizing a DHCP server in the network, the IMM receives a DHCP request from the processor of the server, and the IMM responds to the DHCP request with the network address.

Method 500 may be embodied in a system comprising one or more processors and logic configured to perform the operations of method 500. In another embodiment, method 500 may be performed by a computer program product comprising a computer readable program medium. The computer readable program medium comprises program instructions configured to cause a processor to execute the operations of method 500.

In one such embodiment, the program instructions may be configured to cause a processor to intercept a network boot option initiated by a server over a first network using an IMM connected to the server via a local connection, and receive a network address for the server (from the IMM) without using a DHCP server in the first network.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

The invention claimed is:

1. A method, comprising:
    detecting, by an integrated management module (IMM) connected to a host processor within a server, that the host processor is attempting to boot the server using a network boot option over a first network, including intercepting the network boot option initiated by the host processor;
    selecting, by the IMM, a network address from a predetermined range of network addresses stored in the IMM;
    sending, by the IMM, the network address from the IMM to the host processor;
    requesting, by the IMM, a target configuration from a management server connected to the server via a second network different from the first network;
    receiving, by the IMM, the target configuration, the target configuration including a path to a repository within the management server that contains a boot image; and
    sending, by the IMM, the target configuration to the host processor.

2. The method as recited in claim 1, wherein the network address is a static internet protocol (IP) address selected from a predetermined range of IP addresses stored in the IMM.

3. The method as recited in claim 1, wherein the second network is a private management network.

4. The method as recited in claim 1, further comprising utilizing, by the host processor, the target configuration to initialize the server.

5. The method as recited in claim 1, wherein the target configuration further includes instructions on how to obtain an IP address for the server, a virtual private network (VPN) configuration to reach the repository, and a protocol to be used by the server.

6. The method as recited in claim 1, further comprising acquiring, by the host processor, at least one boot image from the repository.

7. The method as recited in claim 6, further comprising utilizing, by the host processor, the at least one boot image to initialize the server.

8. The method as recited in claim 1, wherein the network boot option initiated by the host processor includes a DHCP request.

9. A computer program product comprising a computer readable program medium, the computer readable program medium comprising program instructions configured to cause a processor in an integrated management module (IMM) connected to a host processor within a server to:
    detect, by the IMM, that the host processor is attempting to boot the server using a network boot option over a first network, including intercepting the network boot option initiated by the host processor;
    select, by the IMM, a network address from a predetermined range of network addresses stored in the IMM;
    send, by the IMM, the network address from the IMM to the host processor;
    request, by the IMM, a target configuration from a management server connected to the server via a second network different from the first network;
    receive, by the IMM, the target configuration, the target configuration including a path to a repository within the management server that contains a boot image; and
    send, by the IMM, the target configuration to the host processor.

10. The computer program product as recited in claim 9, wherein the network address is a static internet protocol (IP) address selected from a predetermined range of IP addresses stored in the IMM.

11. The computer program product as recited in claim 9, wherein the second network is a private management network.

12. The computer program product as recited in claim 9, wherein the target configuration further includes instructions on how to obtain the network address for the server, a virtual private network (VPN) configuration to reach the repository and a protocol to be used by the server.

13. The computer program product as recited in claim 9, wherein the second network is a private management network.

14. The computer program product as recited in claim 9, wherein the network boot option initiated by the host processor includes a DHCP request.

15. A system, comprising:
    a host processor and
    an integrated management module (IMM) connected to the host processor via a local connection, wherein the IMM comprises logic configured to:
        detect, by the IMM, that the host processor is attempting to boot a server using a network boot option over a first network, including intercepting the network boot option initiated by the host processor;
        select, by the IMM, a network address from a predetermined range of network addresses stored in the IMM;
        send, by the IMM, the network address from the IMM to the host processor;
        request, by the IMM, a target configuration from a management server connected to the server via a second network different from the first network;
        receive, by the IMM, the target configuration, the target configuration including a path to a repository within the management server that contains a boot image; and
        send, by the IMM, the target configuration to the host processor.

16. The system as recited in claim 15, wherein the network address is a static internet protocol (IP) address selected from a predetermined range of IP addresses stored in the IMM.

17. The system as recited in claim 15, wherein the second network is a private management network.

* * * * *